Jan. 24, 1967     R. P. NEWMAN     3,300,726

SINE SPECTRUM GENERATOR

Filed March 18, 1964

INVENTOR.
Ralph P. Newman
BY Hugh L. Fisher
ATTORNEY

United States Patent Office 3,300,726
Patented Jan. 24, 1967

3,300,726
SINE SPECTRUM GENERATOR
Ralph P. Newman, Brookfield, Wis., assignor to General Motors Corporation, Detroit, Mich., a corporation of Delaware
Filed Mar. 18, 1964, Ser. No. 352,925
17 Claims. (Cl. 328—187)

This invention relates to complex waveform generation and, more particularly, to a method and apparatus for generating a complex waveform consisting of a plurality of controlled amplitude signals occurring at predetermined equal frequency intervals over a prescribed bandwidth.

The design, manufacture and testing of electronic, mechanical, acoustic and other types of systems frequently involves the problem of determining the response of or effect on the system in question to various electrical, mechanical and acoustic signals or disturbances over a particular frequency range. Often it is impossible to predict with accuracy the environmental condition under which this system must operate. Therefore, an attempt is generally made to determine the disturbance frequency response of the system under test by subjecting it to so-called worst case conditions. For example, an electrical system, such as a filter or an amplifier, may in actual use be required to operate on electrical signals comprising many randomly occurring frequency components. To determine the response of the system to various frequency components it is desirable, upon pre-environmental use of the system, to subject it to a comprehensive testing by applying to the system in a controlled fashion a plurality of signals or disturbances at various frequencies. For another example, systems which are to be used in an environment in which vibration is a factor must be pretested in a controlled artificial environment to determine the effects of vibration upon the system over a wide range of vibration disturbance frequencies.

Various techniques of disturbance frequency response testing of systems are currently employed. Common to these techniques is the generation of a quantity representing the signal or disturbance, and the application of the quantity to a suitable transducer for applying the signal or disturbance to the system under test in a manner which provides a signal compatible with the particular system being tested. One of the techniques in current use is a sine sweep technique in which the output of a sinusoidal waveform generator is progressively varied over the bandwidth within which the system is expected to operate. By suitable means the response of the system under test to the various frequencies may be observed to obtain information as to the single frequency response to the system. It may be readily understood that in the sine sweep technique of frequency response analysis, the system under test is subjected to only one frequency at a time. It is well known that many systems exhibit a cross frequency non-linearity, which is to say that the response of the system to one so-called resonant frequency of disturbance or signal may be different when only that resonant frequency is excited from the response which obtains when a plurality of resonant frequencies are simultaneously excited. Since, as previously indicated, the actual environmental setting of the system when in use is not accurately predictable, it is not safe to assume that the sine sweep technique of disturbance frequency response analysis provides sufficiently accurate data.

To overcome the possible inaccuracies of the sine sweep technique, a second technique has been developed and is known as the random excitation technique. In this technique a random noise generator is employed to produce a complex waveform which contains a plurality of randomly occurring frequencies in such a fashion that several frequencies occur at one instance. However, the various frequency components which occur simultaneously do so in a relatively uncontrolled manner; thus, the power level or amplitude of the simultaneously occurring frequency components may be vastly different. In addition, the particular frequency components, since they occur in a random fashion, may not persist for a long enough time to obtain a full response from the system under test. In addition, the random nature of this type of technique may or may not at any one time produce the particular worst case frequency component combination which could occur during actual use of the system under test.

It is a primary object of this invention to provide an improved method and apparatus for generation of complex waveforms which may, for example, be applied to the determination of the frequency responses of various systems. In accordance with the present invention, a complex waveform may be generated consisting of a predetermined number of frequency components all of which occur at a controlled amplitude for a controlled period of time and which are equally spaced over a predetermined bandwidth. The bandwidth, frequency component amplitude and spacing between the frequency components are all readily controllable to provide precisely the output waveform which will yield the maximum information with respect to the disturbance or signal frequency response of the system under test.

A method of carrying out the invention may be briefly described as comprising the steps of generating a periodically alternating waveform having a predetermined base frequency, dividing the base frequency waveform successively by factors of three to thereby provide a plurality of periodically alternating waveforms which are related in frequency by multiples of three, multiplying the base frequency component with the lowest sub-frequency waveform to produce a complex waveform including two equal amplitude components corresponding to the sum and difference frequencies of the multiplied waveforms, adding the base frequency component to the sum and difference frequency components at a predetermined amplitude and continuing the expansion of the spectrum by sequential multiplications of one combined waveform with the next higher sub-frequency waveform for as many times as is desired according to the number of frequency components desired in the output waveform. Obviously, the combination method may begin with the highest frequency component and continue through the lower components.

Broadly describing an apparatus for carrying out the invention, the subject generator comprises a primary source for producing a periodically alternating waveform having a prescribed frequency and a constant amplitude. The output of the source is frequency divided at a plurality of serially related frequency divider stages to produce a plurality of sinusoidal waveforms occurring at frequencies which are factors of the frequency of the original waveform. In addition, a plurality of cascade-connected modulators are provided, each of which is effective to produce a complex output waveform consisting of the sum and difference components of two frequency-differing input signals. In accordance with the invention, the frequency output of the divider stage which provides the lowest frequency signal is connected to one input of a first of the modulator stages. In addition, the output of the primary source or some divided factor thereof is connected to the other input of the first modulator stage to establish a center frequency for the complex waveform generator output. The first modulator stage mixes or multiplies the two input signals to produce two equal amplitude output components consisting of the sum and difference frequency components or sidebands of the two inputs. Means are provided for summing the original center frequency signal which is applied to said other input of the first modulator stage with the sum and difference frequency components appearing at the output. This summing is done in a controlled amplitude fashion. Thus, in effect, the first modulation step produces a complex waveform consisting of three frequency components, those being the original center frequency signal and the sum and difference frequency components of the first multiplication. These three frequency components are applied to the first input of the second modulator stage. The output of a second divider stage, which may be the second lowest frequency stage, is applied to the second input of the second modulator. The second modulator, like the first, is effective to multiply the two inputs to produce a complex waveform output which, as will be apparent to those skilled in the art, consists of six frequency components. Again, means are provided to sum with these six frequency components the three frequency components which comprise the first input signal to the second modulator stage. In accordance with the invention, additional modulator means may be provided in any number which satisfies the particular circumstances of the test to carry on the multiplication technique to thus provide a complex waveform consisting of $3^N$ frequency components where N equals the number of modulator stages employed. Obviously, the combination method may begin with the highest frequency component and continue through the lower components.

Reviewing the above described technique, it can be seen that since all of the frequency components which are mixed or modulated are obtained from a single source, drift problems do not occur and precise frequency stabilization is not absolutely necessary. Additionally, since a predetermined phase relationship must exist between all of the frequency components, crest factor problems, that is, the ratio of amplitude of the highest amplitude signal to the RMS value of the complex waveform, are further eliminated. Summarily, it may be seen that the output of the generator is a complex waveform consisting of a predetermined number of frequency components which number is readily controllable by the number of modulation stages employed. The amplitude of the frequency components is also readily controlled inasmuch as the sideband or products of the multiplications are of equal amplitude and it remains necessary only to control the amplitude of the output from each of the modulator stages before being transmitted to the input of the next. Further, the particular bandwidth over which the output of the present invention extends and the center frequency thereof is readily controllable by proper selection of the primary frequency source and/or the division factors involved.

These advantages as well as many others not specifically described above will be more apparent upon reading of the following specification which describes particular embodiments of the invention and which are to be taken with the accompanying figures of which:

Figure 1:
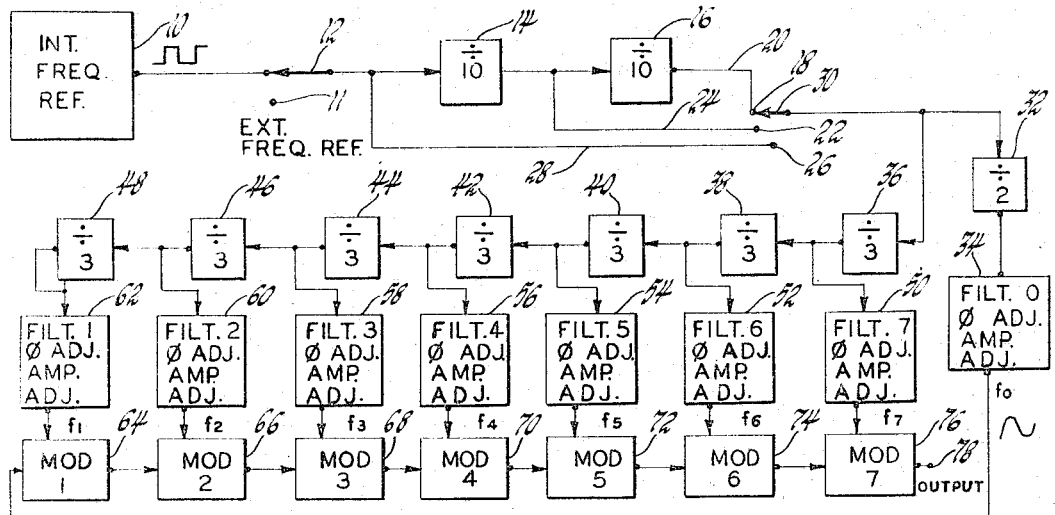
FIGURE 1 is a block diagram of a particular embodiment of the invention.

FIGURE 1 is a block diagram of a specific embodiment of the invention employing seven modulator stages. From the formula given in the foregoing which expresses the number of frequency components in the complex output wave as being equal to $3^N$ where N equals the number of modulator stages, it can be seen that a complex waveform having a frequency spectrum containing as many as 2187 frequency components may be generated by the system of FIGURE 1. The particular frequency component separation and bandwidth is dependent upon the particular values involved as shown in the following. The system includes a source 10 for producing a periodically alternating voltage waveform which may, for example, be a square wave as suggested in the drawing. In addition, provision may be made for use of an external alternating waveform source. The output of the external source may appear at a terminal 11. The output of the internal source 10 or the external source connected to terminal 11 is connected by means of a switch 12 to the input of a first frequency divider 14 which is effective to produce an output square wave signal at a frequency of one-tenth of the input signal frequency. The output of the frequency divider 14 is connected to the input of a second frequency divider 16 which is also effective to divide the input signal frequency by a factor of 10. The output signal of the second frequency divider 16 is connected to a first terminal 18 by means of a conductor 20. The output of the first frequency divider 14 is connected to a second terminal 22 by means of a conductor 24. Similarly, the undivided output of the source 10 is connected to a third terminal 26 by means of a conductor 28. This combination conveniently provides on the terminals 18, 22 and 26 a range of frequencies which may be employed as the basic input signal for the main portion of the generator system. The selection of the input frequency can be made by means of a switch 30 which is rotatable to connect with any one of the terminals 18, 22 and 26. The switch 30 connects the particular frequency signal to the input of a frequency divider 32 which is effective to divide the basic input frequency by a factor of 2 thereby to define a center frequency for the complex output signal waveform. The output of the frequency divider 32 is connected to a filter 34 which is effective to shape the harmonic-rich input square wave into a sinusoidal waveform as suggested in the drawing. The filter 34 is also provided with means for adjusting the amplitude and phase of the output waveform over a convenient range. The output signal from the filter 34 defines, as stated above, the center frequency of the output signal bandwidth and is designated for purposes of discussion as $f_0$.

The basic frequency signal which is selected by the position of switch 30 is also connected to the input of a frequency divider 36 which is the first of seven series-connected or cascaded frequency dividers, all of which are effective to produce a signal at the output which occurs at a frequency of one-third the frequency at the input of the divider. More specifically, the output of frequency divider 36 is connected to the input of a second frequency divider 38. The output of frequency divider 38 is similarly connected through the series of frequency dividers 40, 42, 44, 46 and 48. The output of each of the frequency dividers 36, 40, 42, 44, 46 and 48 is connected through an individual filter circuit similar to filter 34 which is effective to shape the square wave into a sinusoidal waveform. More specifically, the output of frequency divider 36 is connected to the input of a filter 50 which also includes means for adjusting the amplitude and phase of the output signal therefrom. The output signal waveforms of frequency dividers 38, 40, 42, 44, 46 and 48 are connected to the inputs of filters 52, 54, 56, 58, 60 and 62, respectively, all of which are substantially similar to the filters 34 and 50. As suggested in the drawing, each of the filters 52 through 62 is also provided with means for adjusting the amplitude and phase of the output signal waveform over a predetermined range.

Reviewing the generator as described to this point, it can be seen that the combination of frequency source 10 and the cascaded frequency dividers 36, 38, 40, 42, 44, 46, 48 with the associated filter circuits is effective to produce a plurality of periodically alternating waveforms at frequencies which are related by progressively related factors of 3. The lowest frequency signal is designated for purposes of discussion as $f_1$. The remaining signals from the filters are designated in order of increasing frequency as $f_2$, $f_3$, $f_4$, $f_5$, $f_6$ and $f_7$. As previously described, a divider 32 and filter 34 are also provided for establishing a center frequency signal $f_0$.

The circuitry of FIGURE 1 further includes a plurality of cascade-connected modulator circuits which are operative to combine or multiply two input signals of different frequencies to produce an output signal waveform having frequency components corresponding to the sum and difference of two input signal frequencies plus one of the original input signal frequencies. More specifically, the sinusoidal output wave $f_1$ from filter 62 is connected to a first input of a first modulator 64. As a second input to the modulator 64, the sinusoidal waveform $f_0$ is received from the center frequency filter 34. As described above, the output from modulator 64 comprises three frequency components corresponding with $f_0$ and the sum and difference of $f_0$ and $f_1$. This output is connected as a first input to the next modulator 66. A second input $f_2$ is received from filter 60 to be multiplied with the output of modulator 64. Thus, while modulator 64 combines two single frequency signals to produce three frequency components, modulator 66 multiplies a single frequency component $f_2$ with the three frequency components from the prior stage to produce an output waveform having nine frequency components. The expansion of the frequency spectrum may be continued by connecting the output of each modulator to a first input of the next modulator. In addition, the modulation signals $f_3$, $f_4$, $f_5$, $f_6$ and $f_7$ are connected as second inputs to the modulators 68, 70, 72, 74, and 76, respectively. For the seven-modulator combination shown in FIGURE 1, the output waveform is taken from a terminal 78 at the output of modulator 76 on which appears a complex waveform having a frequency spectrum of 2187 components.

Figure 2:
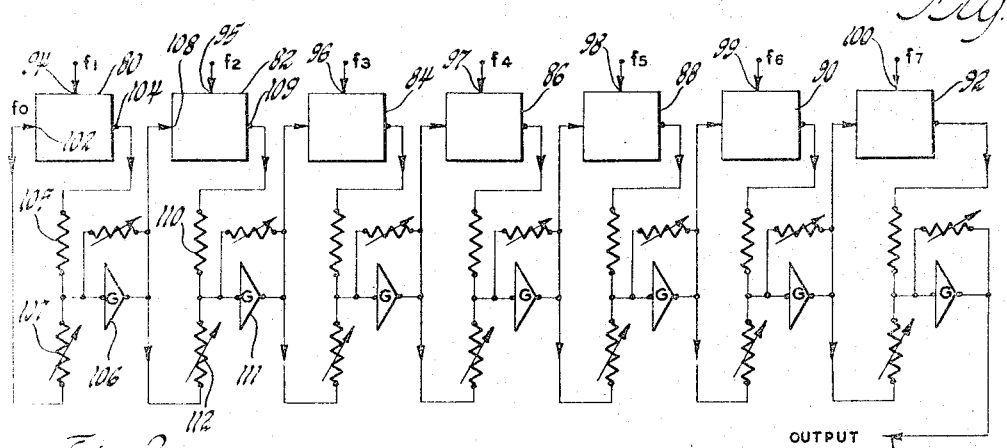
FIGURE 2 is a more detailed representation of a portion of the embodiment shown in FIGURE 1.

The operation of the modulators shown in FIGURE 1 may be best understood by reference to FIGURE 2 which is a partly schematicized representation of a specific modulator construction which satisfies the requirements of the present invention. In FIGURE 2, there is shown a plurality of heterodyne type multipliers 80, 82, 84, 86, 88, 90 and 92, which correspond in number to the seven modulator stages shown in FIGURE 1. Each of the multipliers, which may for example be a proper combination of triode tubes having low odd harmonic distortion and low random noise characteristics is effective to multiply two input signals of different frequencies to produce an output corresponding to the sum and difference frequencies of the input signals. One input of each of the multipliers is connected to receive one of the frequency related sinusoidal waveforms $f_1$, $f_2$, $f_3$, $f_4$, $f_5$, $f_6$ and $f_7$ which are provided by the filters 50, 52, 54, 56, 58, 60 and 62, respectively, as shown in FIGURE 1. Thus, the signal corresponding with $f_1$ is connected to an input 94 of multiplier 80 and the following signals of increasingly higher frequency $f_2$, $f_3$, $f_4$, $f_5$, $f_6$ and $f_7$ are connected to the inputs 95, 96, 97, 98, 99 and 100 of multipliers 82, 84, 86, 88, 90 and 92, respectively. The center frequency signal $f_0$ from filter 34 of FIGURE 1 is connected to another input 102 of the multiplier 80. A signal appears at the output 104 of multiplier 80 which corresponds to the sum and difference sidebands $f_0+f_1$ and $f_0-f_1$. The output signal, including these two frequency components, is applied by way of a resistor 105 to the input of a variable gain amplifier 106. Additionally, the center frequency signal $f_0$ is connected through a variable resistor 107 to the input of the variable gain amplifier 106. Thus, the net output of the first modulator stage consists of the center frequency signal $f_0$ and the sum and difference components of $f_0$ and the lowest frequency modulation signal $f_1$. According to the adjustment of resistor 107 the $f_0$ component may be summed with the sum and difference components at an amplitude which is equal to the sum and difference components. These three frequency components are then applied at an amplitude which corresponds with the gain setting of the amplifier 106 to an input 108 of the multiplier 82. The input 95 of the multiplier 82 receives the next higher frequency modulation signal $f_2$. This modulation frequency signal is multiplied with the input at 108 to produce six frequency components which correspond with the sum and difference frequencies of the waveforms at inputs 108 and 95. The six frequency components appear at output 109 and are applied via resistor 110 to the input of a second variable gain amplifier 111. In addition, the original three frequency components from the first amplifier 106 are added via variable resistor 112 to the six frequency components appearing at output 109. Accordingly, the net output of the second modulation stage which includes multiplier 82 consists of nine frequency components which are symmetrically disposed about the center frequency $f_0$ and which are separated by frequency increments corresponding to $f_1$. This multiplication technique may be carried out in the following modulator stages including multipliers 84, 86, 88, 90 and 92 to ultimately produce at output terminal 78 a spectrum of 2187 frequency components, all of which may be controlled in amplitude by means of the adjustments shown in FIGURE 2 and all of which are uniformly distributed throughout the frequency spectrum by increments corresponding with the lowest modulation frequency $f_1$. This frequency increment is determined also by the selection made at switch 30 and the frequency of source 10. It will also be apparent to those skilled in the art that if a lesser number of frequency components is desired in the spectrum, the output of any one of the modulator stages may be used as the complex wave output. Alternatively, the number of modulator stages may be expanded as fits the particular requirement placed upon the wave to be generated.

The operation of the system shown in FIGURES 1 and 2 may be best described with reference to a specific example. The frequency of the source 10 may be assumed to be 2187 cycles per second. If the desired frequency range of 2187 c.p.s. is not available from the source, an external frequency source may be connected to terminal 11 and the switch 12 positioned accordingly. It is further assumed that switch 30 is connected to terminal 26 such that neither of the frequency dividers 14 and 16 is employed. Thus, the output of frequency divider 32 provides a center frequency of 1093.5 c.p.s. In addition, the plurality of frequency dividers 36, 38, 40, 42, 44, 46 and 48 is effective to sub-divide the basic frequency signal of 2187 c.p.s. such that the lowest frequency modulation signal $f_1$ equals 1 c.p.s. It may readily be calculated that $f_2=3$ c.p.s., $f_3=27$ c.p.s., and so on up to modulation signal $f_7$ which is 729 c.p.s. The modulation process performed by modulator 64 thus mixes $f_0$ and $f_1$ to provide an output signal to the second modulator 66 which consists of three frequency components. These are the center frequencies of 1093.5 c.p.s. and sum and difference frequency components of 1092.5 c.p.s. and 1094.5 c.p.s. The spectrum is then increased on both sides of the center frequency by the subsequent modulation processes until the output at terminal 78 comprises a frequency spectrum of 2187 frequency components which are equally spaced at 1 c.p.s. intervals around the center frequency of 1093.5 c.p.s. Due to the provision of the phase and amplitude adjustments in the various adjustments shown in FIGURE 1, and also as schematically indicated in FIGURE 2, the phases and amplitudes of the various frequency components of the output spectrums may be adjusted to virtually eliminate crest factor problems and frequency component inequalities. The output waveform may thus be adjusted such that all 2187 of the components are precisely equal in amplitude.

Figure 3:
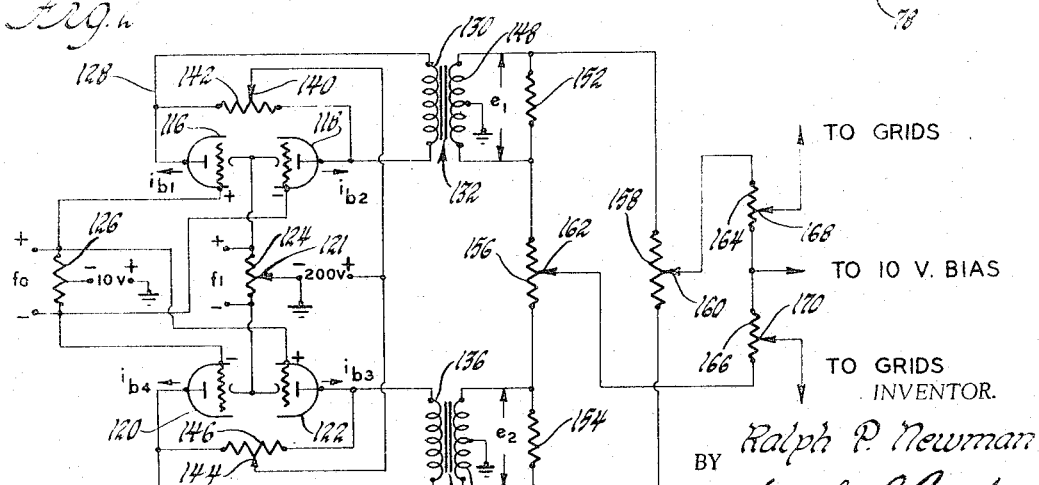
FIGURE 3 is a schematic diagram of a particular electrical circuit which may be advantageously used in carrying out the invention.

A preferred electrical circuit for the construction of the modulator stages shown in FIGURE 1 is schematically indicated in FIGURE 3. The modulator circuit of FIGURE 3 includes a first pair of triode tubes 116 and 118 which are connected in a common cathode configuration. The modulator includes a second pair of triode tubes 120 and 122 which are also connected common cathode. The common cathodes of tubes 116 and 118 are connected to ground across a portion of resistor 124 defined by the position of a displaceable contact 121. Similarly, the cathodes of tubes 120 and 122 are connected to ground across a portion of resistor 124. The first modulation input signal $f_1$ is connected into the modulator across resistor 124 as shown. In this manner of connection, the signal $f_1$ is applied to the pairs of tubes in opposite phase relationship. The center frequency signal $f_0$ is applied across second resistor 126 which is coupled to the tubes 116, 118, 120 and 122 such that the grids of tubes 116 and 122 are connected to one side of the resistor 126 and the grids of tubes 118 and 120 are connected to the other side of resistor 126. Thus, tubes 116 and 122 receive the center frequency signal $f_0$ in opposite phase relationship to the receipt of the signal by tubes 118 and 120. Accordingly, the tubes operate in a push-pull mode through the output circuits which are defined by conductors 128 and 134 of which conductor 128 connects the plate of tube 116 to the plate of tube 118 across the primary coil 130 of a first transformer 132. The second conductor 134 connects the plate of tube 120 to the plate of tube 122 across a primary coil 136 of a second transformer 138. A 200-volt plate supply is connected commonly to an adjustable contact 140 on a resistor 142 which is connected between the plates of tubes 116 and 118 and an adjustable contact 144 which contacts the resistor 146 connecting the plates of tubes 120 and 122. Transformers 132 and 138 include secondary coils 148 and 150, respectively, both of which are center tapped to ground as shown. Secondary coil 148 is connected across a resistor 152 while secondary coil 150 is connected across a resistor 154. The resistors 152 and 154 are connected across a resistor 156 on one side and a resistor 158 on the other side. An output circuit for the following modulator stage includes an adjustable contact 160 on resitsor 158 and adjustable tap 162 which may be adjusted along resistor 156. Tap 160 is connected to tap 162 by means of an output circuit including the series combination of resistors 164 and 166. An adjustable tap 168 on resistor 164 connects the output of the first modulator stage shown in FIGURE 3 to the grid of the triode tubes in the subsequent modulator stage while an adjustable tap 170 on resistor 166 connects the output signal to the grids of the second pair of triode tubes in the subsequent modulator stage. By means of the adjustments on resistors 156 and 158, the center frequency may be adjusted to precisely equal the sidebands in amplitude. The center frequency $f_0$ may be made to emerge from the output of the modulator stage shown in FIGURE 2 by virtue of the fact that it is connected to the grids of the tubes which are operated in the non-linear portions of the characteristic curves. The modulation frequency $f_1$, being connected to the cathodes of the tubes, is effectively cancelled out.

It is to be understood that while the present invention has been described with reference to a specific embodiment thereof, the description is not to be construed in a limiting sense. For a definition of the invention, reference should be made to the appended claims.

What is claimed is:

1. Apparatus for generating a complex waveform having a plurality of frequency components uniformly distributed over a desired bandwidth comprising, a source of periodically varying electrical signals, a plurality of divider means each having an input and an output and operative to produce a signal at the output at a frequency of one-third the frequency at the input, the divider means being connected in cascade with the input of the first of the plurality of divider means being connected to the source, a plurality of modulator means each having first and second inputs and an output and operative to produce a signal at the output comprising the sum and difference frequency components of the signals applied to the inputs, each of the modulator means further including means to add the signal appearing at the first input thereof to the signal at the output thereof, the plurality of modulator means being connected in cascade such that the output of each modulator means is connected to the first input of the following modulator means, means connecting the source to the first input of the first of the cascaded modulator means, and means connecting the outputs of the divider means to the second inputs of the modulator means in such order that the lowest output frequency of said divider means is connected to the second input of the first of the modulator means and successively higher frequency outputs of the divider means are connected in sequence to the following modulator means.

2. Apparatus as defined in claim 1 wherein each of the modulator means further includes means to adjust the amplitude of the signal added to the output such that the amplitude of the added signal is equal in amplitude to the sum and difference frequency components.

3. Apparatus for generating a complex waveform having a plurality of selected frequency components uniformly distributed over a desired bandwidth comprising, means for providing a plurality of periodically varying electrical modulation signals at respective frequencies each of which is a multiple of three of the next lowest frequency signal, means for providing a periodically varying electrical signal at a frequency defining the center frequency of the desired bandwidth, a plurality of modulator means each having first and second inputs and an output and operative to produce a signal at the output comprising the sum and difference frequency components of the input signals thereto, each of the modulator means further including means to add the signal appearing at the first input thereof to the output signal, the plurality of modulator means being connected in cascade such that the output of each modulator means is connected to the first input of the following modulator means, means connecting the center frequency signal to the first input to the first of the cascaded modulator means, and means connecting the modulation signals to respective second inputs of the modulator means in such order that the lowest frequency signal is connected to the second input of the first of the modulator means and progressively higher frequency modulation signals are connected to the following modulator means.

4. Apparatus for generating a complex waveform having a plurality of selected frequency components uniformly distributed over a desired bandwidth comprising, means for providing a plurality of periodically varying electrical modulation signals at respective frequencies each of which is a multiple of three of the next lowest frequency signal, means for providing a periodically varying electrical signal at a frequency defining the center frequency of the desired bandwidth, a plurality of modulator means each having first and second inputs and an output and operative to produce an output signal comprising equal amplitude components corresponding in frequency to the sum and difference of the frequencies of the signals applied to the inputs thereof, each of the modulator means further including means to add the signal appearing at the first input thereof to the output signal at a variable amplitude whereby the amplitude of the added signal may be adjusted to equal the amplitude of the sum and difference frequency components, means connecting the center frequency signal to the first input to the first of the cascaded modulator means, and means connecting the modulation signals to respective second inputs of the modulator means in such order that the lowest frequency signal is connected to the second input of the first of the modulator means and progressively higher frequency modulation signals are connected to the following modulator means.

5. Apparatus for generating a complex waveform having a plurality of selected frequency components uniformly distributed over a desired bandwidth comprising, means for providing a plurality of periodically varying electrical modulation signals at respective frequencies each of which is a multiple of three of the next lowest frequency signal, means for providing a periodically varying electrical signal at a frequency defining the center frequency of the desired bandwidth, a plurality of modulator means each having first and second inputs and an output and operative to produce an output signal comprising equal amplitude components corresponding in frequency to the sum and difference of the frequencies of the signals applied to the inputs thereof, each of the modulator means further including means to add the signal appearing at the first input thereof to the output signal at a variable amplitude whereby the amplitude of the added signal may be adjusted to equal the amplitude of the sum and difference frequency components, means including phase and amplitude adjustment means connecting the center frequency signal to the first input of the first of the cascaded modulator means, means including a plurality of additional phase and amplitude adjustment means connecting the modulation signals to respective second inputs of the modulator means in such order that the lowest frequency signal is connected to the first of the modulator means and progressively higher frequency modulation signals are connected to the following modulator means in sequence.

6. Apparatus for generating a complex waveform consisting of a plurality of frequency components uniformly distributed over a desired bandwidth comprising, a source of electrical signals which vary periodically at a predetermined frequency, a plurality of divider means each having an input and an output and operative to produce a signal at the output at a frequency of one-third the frequency at the input, the divider means being connected in cascade with the input of the first of the plurality of divider means being connected to the source, a plurality of modulator means each having first and second inputs and an output and operative to produce a signal at the output comprising the sum and difference frequency components of the signals applied to the inputs, each of the modulator means further including means to add the signal appearing at the first input thereof to the signal at the output thereof, the plurality of modulator means being connected in cascade such that the output of each modulator means is connected to the first input of the following modulator means, means connecting the source to the first input of the first of the cascaded modulator means, a plurality of means connected individually to the outputs of the divider means for adjusting the phase and amplitude of the output signals therefrom and to connect said signals to the second inputs of the modulator means in such order that the lowest output frequency of said divider means is connected to the second input of the first of the modulator means and successively higher frequency outputs of the divider means are sequentially connected to the following modulator means.

7. Apparatus for generating a complex waveform consisting of a plurality of frequency components uniformly distributed over a desired bandwidth comprising, a source of alternating signals which vary periodically at a predetermined frequency, mode selection means including a first plurality of divider means each having an input and an output and operative to produce a signal at the output at a frequency which is a fraction of the frequency at the input, the first plurality of divider means being connected in cascade, the source being connected to the first of the divider means, a second plurality of divider means each having an input and an output and operative to produce a signal at the output at a frequency of one-third of the frequency of a signal at the input thereof, the second plurality of divider means being connected in cascade, switch means for selectively connecting the input of the first of the second plurality of divider means to the source or to the outputs of the first plurality of divider means, a plurality of modulator means each having first and second inputs and an output and operative to produce a signal at the output comprising the sum and difference frequency components of the signals applied to the inputs thereof, each of the modulator means further comprising means for adding at a predetermined amplitude the signal appearing at the first input thereof to the signal at the output thereof, the plurality of modulator means being connected in cascade such that the output of each modulator means to the second inputs of the modulator means in such order that the lowest frequency output is connected to the first of the modulator means and successively higher frequency outputs are connected in sequence to the following modulator means.

8. Apparatus for generating a complex waveform having a plurality of frequency components uniformly distributed over a desired bandwith comprising, means for providing a periodically varying electrical signal at a selected frequency, first divider means having an input connected to receive the electrical signal and operative to produce an output at a frequency which is one-half of the selected frequency thereby defining the center frequency of the desired bandwith, a plurality of second divider means each having an input and an output and operative to produce an output signal at a frequency of one-third the frequency at the input, the divider means being connected in cascade, the input of the first of the divider means being connected to receive said electrical signal, a plurality of modulator means each having first and second inputs and an output and operative to produce an output signal corresponding in frequency to the sum and difference of the frequencies of the input signals, each of the modulator means further comprising means to add the signal appearing at the first input thereof to the output signal, the plurality of modulator means being connected in cascade such that the output of each is connected to the first input of the following modulator means, means connecting the output of the first divider means to the first input of the first of the plurality of modulator means, and means connecting the outputs of the second divider means to the second inputs of the modulator means in such order that the lowest frequency output is connected to the first of the modulator means and successively higher frequency outputs are connected in sequence to the following modulator means.

9. Apparatus for generating a complex waveform having a plurality of selected frequency components uniformly distributed over a desired bandwith comprising, means for providing a periodically varying electrical signal at a selected frequency, first divider means having an input connected to receive the electrical signal and operative to produce an output at a frequency which is one-half of the selected frequency thereby defining the center frequency of the desired bandwidth, a plurality of second divider means each having an input and an output and operative to produce an output signal at a frequency of one-third the frequency at the input, the divider means being connected in cascade, the input of the first of the divider means being connected to receive said electrical signal, a plurality of modulator means each having first and second inputs and an output and operative to produce an output signal corresponding in frequency to the sum and difference of the frequencies of the input signals, each of the modulator means further comprising variable impedance means for adding the signal appearing at the first input thereof to the output signal at a predetermined amplitude, the plurality of modulator means being connected in cascade such that the output of each is connected to the first input of the following modulator means, means connecting the output of the first divider means to the first input of the first of the plurality of modulator means, and means connecting the outputs of the second divider means is connected to the first input of the following modulator means, means connecting the first input of the first of the plurality of modulator means to receive the signal applied through said switch means to the input of the first of said second plurality of divider means, and means connecting the outputs of the second plurality of divider means to the second inputs of the modulator means in such order that the lowest frequency output signal of said second plurality of divider means is connected to the second input of the first of the modulator means and progressively higher frequency signals are connected in sequence to the following modulator means.

10. Apparatus as defined in claim 9 including a plurality of individual phase and amplitude adjustment means connected between the output of the first divider means and the first input of the plurality of modulator means, and between the outputs of the second divider means and the second inputs of the modulator means.

11. Apparatus for complex waveform generation including a modulator for producing an output signal having frequency components corresponding to a carrier frequency applied to a first input and the sum and difference of the carrier frequency and a modulation signal frequency applied to a second input, the modulator comprising, first and second pairs of vacuum tubes having plate, grid and cathode electrodes, first input means for connecting a carrier frequency signal to the grid electrodes of the first and second pairs such that the carrier signal appearing at the grid of one tube of each of the first and second pairs is opposite in phase to the carrier signal appearing at the grid of the other tube of each of the pairs, second input means for connecting a modulation frequency signal to the cathode electrodes of the first and second pairs such that the modulation signal at the cathodes of the first pair is opposite in phase to the modulation signal at the cathodes of the second pair, a first transformer having primary and secondary windings, the primary winding being connected across the plate electrodes of the first pair of tubes, a center tap connecting the secondary winding to a point of reference potential, a second transformer having primary and secondary windings, the primary winding being connected across the plate electrodes of the second pair of tubes, a center tap connecting the secondary winding to a point of reference potential, and output circuit means including a first linear impedance element connected across first points of opposite phase of the secondary windings, a second linear impedance element connected across second points of opposite phase of the secondary windings, a first output terminal connected to the first impedance element and a second output terminal connected to the second impedance element.

12. Apparatus for generating a complex waveform having a plurality of frequency components uniformly distributed over a desired bandwidth comprising, a source of periodically varying electrical signals, a plurality of divider means each having an input and an output and operative to produce a signal at the output at a frequency of one-third the frequency at the input, the divider means being connected in cascade with the input of the first of the plurality of divider means being connected to the source, a plurality of modular means each having first and second inputs and an output and operative to produce a signal at the output comprising the sum and difference frequency components of the signals applied to the inputs, each of the modular means further including means to add the signal appearing at the first input thereof to the signal at the output thereof, the plurality of modulator means being connected in cascade such that the output of each modulator means is connected to the first input of the following modulator means, means connecting the source to the first input of the first of the cascaded modulator means, and means connecting the outputs of the divider means in continuous frequency order to the second inputs of the modulator means.

13. Apparatus for generating a complex waveform having a plurality of frequency components uniformly distributed over a desired bandwidth comprising, a source of periodically varying electrical signals, a plurality of divider means each having an input and an output and operative to produce a signal at the output at a frequency of one-third the frequency at the input, the divider means being connected in cascade with the input of the first of the plurality of divider means being connected to the source, a plurality of modulator means each having first and second inputs and an output and operative to produce a signal at the output comprising the sum and difference frequency components of the singals applied to the inputs, each of the modulator means further including means to add the signal appearing at the first input thereof to the signal at the output thereof, the plurality of modulator means being connected in cascade such that the output of each modulator means is connected to the first input of the following modulator means, means connecting the source to the first input of the first of the cascaded modulator means, and means connecting the outputs of the divider means to the second inputs of the modulator means in such order that the highest output frequency of said divider means is connected to the second input of the first of the modulator means and successively lower frequency outputs of the divider means are connected in sequence to the following modulator means.

14. Apparatus for generating a complex waveform having a plurality of selected frequency components uniformly distributed over a desired bandwidth comprising, means for providing a plurality of periodically varying electrical modulation signals at respective frequencies each of which is a multiple of three of the next lowest frequency signal, means for providing a periodically varying electrical signal at a frequency defining the center frequency of the desired bandwidth, a plurality of modulator means each having first and second inputs and an output and operative to produce a signal at the output comprising the sum and difference frequency components of the input signals thereto, each of the modulator means further including means to add the signal appearing at the first input thereof to the output signal, the plurality of modulator means being connected in cascade such that the output of each modulator means is connected to the first input of the following modulator means, means connecting the center frequency signal to the first input to the first of the cascaded modulator means, and means connecting the modulation signals to respective second inputs of the modulator means in such order that the highest frequency signal is connected to the second input of the first of the modulator means and progressively lower frequency modulation signals are connected to the following modulator means.

15. Apparatus for generating a complex waveform having a plurality of selected frequency components uniformly distributed over a desired bandwidth comprising, means for providing a plurality of periodically varying electrical modulation signals at respective frequencies each of which is a multiple of three of the next lowest frequency signal, means for providing a periodically varying electrical signal at a frequency defining the center frequency of the desired bandwidth, a plurality of modulator means each having first and second inputs and an output and operative to produce an output signal comprising equal amplitude components corresponding in frequency to the sum and difference of the frequencies of the signals applied to the inputs thereof, each of the modulator means further including means to add the signal appearing at the first input thereof to the output signal at a variable amplitude whereby the amplitude of the added signal may be adjusted to equal the amplitude of the sum and difference frequency components, means connecting the center frequency signal to the first input to the first of the cascaded modulator means, and means connecting the modulation signals to respective second inputs of the modulator means in such order that the highest frequency signal is connected to the second input of the first of the modulator means and progressively lower frequency modulation signals are connected to the following modulator means.

16. Apparatus for generating a complex waveform having a plurality of selected frequency components uniformly distributed over a desired bandwidth comprising, means for providing a plurality of periodically varying electrical modulation signals at respective frequencies each of which is a multiple of three of the next lowest frequency signal, means for providing a periodically varying electrical signal at a frequency defining the center frequency of the desired bandwidth, a plurality of modulator means each having first and second inputs and an output and operative to produce an output signal comprising equal amplitude components corresponding in frequency to the sum and difference of the frequencies of the signals applied to the inputs thereof, each of the modulator means further including means to add the signal appearing at the first input thereof to the output signal at a variable amplitude whereby the amplitude of the added signal may be adjusted to equal the amplitude of the sum and difference frequency components, means including phase and amplitude adjustment means connecting the center frequency signal to the first input of the first of the cascaded modulator means, means including a plurality of additional phase and amplitude adjustment means connecting the modulation signals to respective second inputs of the modulator means in such order that the highest frequency signal is connected to the first of the modulator means and progressively lower frequency modulation signals are connected to the following modulator means in sequence.

17. Apparatus for generating a complex waveform consisting of a plurality of frequency components uniformly distributed over a desired bandwidth comprising, a source of electrical signals which vary periodically at a predetermined frequency, a plurality of divider means each having an input and an output and operative to produce a signal at the output at a frequency of one-third the frequency at the input, the divider means being connected in cascade with the input of the first of the plurality of divider means being connected to the source, a plurality of modulator means each having first and second inputs and an output and operative to produce a signal at the output comprising the sum and difference frequency components of the signals applied to the inputs, each of the modulator means further including means to add the signal appearing at the first input thereof to the signal at the output thereof, the plurality of modulator means being connected in cascade such that the output of each modulator means is connected to the first input of the following modulator means, means connecting the source to the first input of the first of the cascaded modulator means, a plurality of means connected individually to the outputs of the divider means for adjusting the phase and amplitude of the output signals therefrom and to connect said signals to the second inputs of the modulator means in such order that the highest output frequency of said divider means is connected to the second input of the first of the modulator means and successively lower frequency outputs of the divider means are sequentially connected to the following modulator means.

References Cited by the Examiner
UNITED STATES PATENTS

| | | | |
|---|---|---|---|
| 2,766,379 | 10/1956 | Pugsley | 328—187 X |
| 2,811,713 | 10/1957 | Spencer | 328—104 |
| 2,958,827 | 11/1960 | Anderson et al. | 328—104 X |
| 3,080,526 | 3/1963 | Porter | 328—187 |

ARTHUR GAUSS, *Primary Examiner.*

J. S. HEYMAN, *Assistant Examiner.*